(12) United States Patent
Zwiefelhofer (10) Patent No.: US 7,751,727 B2
(45) Date of Patent: Jul. 6, 2010

(54) EXPENSE RECOVERY SYSTEM FOR MULTI-FUNCTION DEVICE WITH SMART DATA ENTRY

(75) Inventor: Ray Zwiefelhofer, Tempe, AZ (US)

(73) Assignee: Nqueue, Inc., Tempe, AZ (US)

( * ) Notice: Subject to any disclaimer, the term of this patent is extended or adjusted under 35 U.S.C. 154(b) by 0 days.

(21) Appl. No.: 12/421,055

(22) Filed: Apr. 9, 2009

(65) Prior Publication Data

US 2009/0198601 A1     Aug. 6, 2009

Related U.S. Application Data (63) Continuation of application No. 11/850,572, filed on Sep. 5, 2007, now Pat. No. 7,526,213, which is a continuation of application No. 11/397,460, filed on Apr. 3, 2006, now Pat. No. 7,526,212, which is a continuation-in-part of application No. 10/841,065, filed on May 7, 2004, now Pat. No. 7,076,184.

(60) Provisional application No. 60/469,183, filed on May 8, 2003.

(51) Int. Cl.
    *G03G 21/02*     (2006.01)

(52) U.S. Cl. .................................. 399/8; 399/79; 705/34
(58) Field of Classification Search .................... 399/8, 399/79, 80, 24; 358/1.15; 705/30, 34
    See application file for complete search history.

(56) References Cited

U.S. PATENT DOCUMENTS

| | | | |
|---|---|---|---|
| 6,026,380 | A | 2/2000 | Weller |
| 6,216,113 | B1 | 4/2001 | Aikens |
| 6,587,972 | B1 | 7/2003 | Baird et al. |
| 7,062,179 | B2 | 6/2006 | Ikeno |
| 2001/0053295 | A1 | 12/2001 | Kujirai et al. |
| 2002/0026546 | A1 | 2/2002 | Yamaguchi |
| 2004/0136748 | A1 | 7/2004 | Zhang et al. |
| 2005/0009560 | A1 | 1/2005 | Cavill et al. |
| 2005/0129423 | A1 | 6/2005 | Lester et al. |

*Primary Examiner*—Sophia S Chen
(74) *Attorney, Agent, or Firm*—Kauth, Pomeroy, Peck & Bailey LLP (57) ABSTRACT

An expense recovery system for a digital MFD in the form of a modification to the application program interface of the MFD to allow input of identifiers for the user, the client and the job and to transmit this information and other transaction data to a host computer for billing purposes. Data entry is made faster and more accurate by minimizing keystrokes. The information is transmitted over a network and, optionally, the host computer may be located remote from the MFD.

9 Claims, 8 Drawing Sheets

EXPENSE RECOVERY SYSTEM FOR MULTI-FUNCTION DEVICE WITH SMART DATA ENTRY

CROSS-REFERENCE TO RELATED APPLICATIONS

This application is a continuation of U.S. patent application Ser. No. 11/850,572 filed Sep. 5, 2007 now U.S. Pat. No. 7,526,213, which is a continuation of U.S. patent application Ser. No. 11/397,460 filed Apr. 3, 2006 now U.S. Pat. No. 7,526,212 which is a continuation-in-part of U.S. patent application Ser. No. 10/841,065 filed May 7, 2004 now U.S. Pat. No. 7,076,184, which claimed the benefit of U.S. Provisional Application Ser. No. 60/469,183 filed May 8, 2003.

FIELD OF INVENTION

This invention relates generally to managing digital document systems, referred to herein as multi-function devices. This invention relates particularly to a method and apparatus for improving document cost accountability utilizing a server networked to one or more multi-function devices.

BACKGROUND

Photocopiers are well known in the art. When the copier illuminates a sheet of paper on the glass surface of a copier, a pattern of the image is projected onto the positively charged photoreceptive drum below. Light reflected from blank areas on the page hits the drum and causes the charged particles coating the drum's surface to be neutralized. This leaves positive charges only where there are dark areas on the paper that did not reflect light. These positive charges attract negatively charged toner. The toner is then transferred and fused to a positively charged sheet of paper, creating an image that matches the original.

In the process of performing services for clients, many businesses make copies of documents on copiers. The expense of copying is significant. In an attempt to recoup the copy expenses, many businesses, especially firms that bill by the hour for their services such as law, accounting, and consulting firms, charge the clients for each copy made. Efficient management of copies can actually turn the copy center into a profit center for the business, which provides incentive for providing copy accountability with a number of methods.

For example, it is known in the prior art to install a copy control module onto a copier. The copy control module asks the user to enter in a user identifier (ID) and a client identifier. Upon receipt of valid user identifier and client identifier, the control module enables a switch that allows the copier to make copies. The copy control module is not able to receive data from the copier, so the copy control module determines the number of copies made by counting electrical spikes which occur each time a copy is made (referred to in the industry as counting flashes), and associates the number with the client identifier. Counting flashes is inherently inaccurate because of difficulties differentiating data spikes from noise, as well as the fact that spikes are often created with no resultant copy, for example as paper gets stuck or toner runs out, etc.

Data is either manually collected at the copier with a portable computer or transmitted through copy control module network lines to the business's time and billing (or accounting) system, which adds the cost of the copies made to the client's bill. The disadvantages of this system include that each copier requires its own copy control module, and the modules are typically supplied by a different vendor than the copier. It is desirable to have a more accurate means of tracking copy counts. It is also desirable to eliminate the copy control module and yet be able to track associated copies made to client accounts.

A typical example of a prior art copy control module system is described in U.S. Pat. No. 6,026,380, assigned to On-Site Sourcing, Inc. This patent describes a photocopy count system that requires one remote mini-terminal to be associated with each photocopier. The mini-terminals communicate with a central control computer via a multiport serial board. The patent describes two different mini-terminal versions to suit photocopiers from Xerox Corporation and photocopiers from Canon, Inc. This highlights the problems identified above of a separate copy control module being required for each photocopier and different versions of the hardware being required for each brand of copier.

Copier companies typically charge the businesses a fee for each copy made, as well as a monthly fee for servicing each copier. Periodically a service technician visits each copier to monitor and record the number of copies the copy control module has counted. For large law firms, servicing each copier could mean visiting several copiers on each of multiple floors—a time-consuming process. Furthermore, at a specific copy count, the technician conducts preventive maintenance on the copier. It is desirable to service the machine near a desired number of copies to keep the machine in good working order. However, due to the labor-intensive nature of having to visit each copier to determine the number of copies made, sometimes the number of copies greatly exceeds the suggested volume before preventive maintenance is performed, thereby risking potential damage to the equipment or permitting it to print lower quality copies. For lower volume copiers, the visits to each copier are largely a waste of time.

From the business's internal perspective, it is desirable to know who is making copies, how long it takes (turnaround time), what the job is for, etc. It is desirable to be able to track copy jobs at a job-level for internal expense tracking, as well as from a client perspective for external expense tracking.

Advances in digital technology and web-based computing have improved copier performance. In contrast to analog copiers that use the physical translation of an image on one piece of paper to another, digital copiers create and receive data in digital format and create the image from the data directly on the drum. Due to the ability of digital data to be quantified, for example in single page quantities, the number of copies made can be determined accurately. It is desirable to access the accurate counts of copies directly.

Due to the benefits of digital technology, digital copiers can do much more than simply make copies of a paper document. For example, many digital copiers can make a photocopy of a paper document, print a paper document from an electronic file, scan a paper document and create an electronic file that can be stored or transmitted digitally, or fax a digital file from either a scan of a paper document or from an electronic file. Such digital document systems are known in the art as multi-function devices or MFDs, for short. The present invention applies generally to MFDs, and a copier in the preferred embodiment.

The data stream for digital documents can come from multiple sources, such as a print request from a print file, a fax, or a scan of a paper image. Because these MFDs are so versatile, they are often electrically connected (networked) to transmit data, by hardwire or wirelessly, to remote personal computers (PC). Because digital MFDs can now be configured as stations on a network, a user of a personal computer on the network can send a print request to a MFD instead of a printer in order to obtain a paper copy of the document. The user can also scan, fax and email from the MFD. Further, the same network connection that lets a user transmit a print job to the MFD can also be used to transmit information from the MFD. It is desirable to transmit such information to a central server that can compile data from multiple MFDs. It is also desirable to communicate that information to a business's accounting or time and billing system, so that clients can be charged for the number of copies (documents) made.

Therefore, it is an object of this invention to provide a system of copy accountability that can be managed from a central location or server. It is another object to provide a hosted system of cost recovery such that, optionally, the central location or server is remote from the MFD. It is another object to utilize the built-in network connection of a MFD to transmit to and receive data from this central server. It is another object of this invention to eliminate the need for a separate function control module at each MFD. It is a further object to utilize a MFD's built-in hardware and software for data entry, data validation, and job tracking. It is another object to count and track digital documents, such as copies, accurately by obtaining document counts from the MFD in digital format, as opposed to measuring a count independently of the MFD. It is another object to make data entry faster and more accurate by minimizing the number of keystrokes required. It is another object to count and track jobs accurately. It is a further object of this invention to provide a system that enables the compilation of data from multiple MFDs and provide necessary conversion and importation into the business billing system.

SUMMARY OF THE INVENTION

The present invention is a computer-based method and apparatus for document accounting, expense recovery and management. The software to implement the system is embedded in the MFD's software. The system utilizes a host computer that is networked with one or more digital MFDs and a time and billing system. Preferably the network is web-enabled so that it easily configured to communicate securely at a host computer physically remote from the MFD. The system utilizes the MFDs' built-in network connections to transmit to and receive data from this host computer and to the time and billing system. The application program interface in the MFD is modified to include an expense recovery module that facilitates input of data and communication with the expense recovery system and the time and billing system.

To make copies for a client, the expense of which is to be later recouped from the client, a user enters a user identifier and a client identifier into the MFD's touch screen or keypad that has an interface that captures information from the user and transmits it to the host computer before copying starts. Because the system is embedded, no external copy control terminal is used. In one form the user identifier and a client identifier are validated by the host computer against a current user and client list, which is available from the existing billing system. In another form these functions are performed locally at the MFD.

The preferred embodiment has a number of features to facilitate fast and correct data entry. These include a text display of the client name associated with a numeric client identifier and a number of tools to minimize the number of keystrokes needed to make copies and account for them thoroughly. Other embodiments use proximity sensors, card readers, or biometric devices to eliminate many of the keystrokes.

Upon entry of valid identifiers, the MFD is enabled to function, such as to make copies, fax a document, or scan it. If no valid client identifier is entered, the system can be set to default to a default identifier and the MFD is enabled, or set to deny access until a valid identifier is entered. Upon completion of the copy job information is transmitted to the host computer to associate the number of copies with the appropriate client (or default) identifier, and transmits the information to the time and billing system for future billing to the client and cost recovery. The user may periodically receive an accounting of copies that were made to the default identifier for further review, commonly known as exception editing. The host computer also tracks job data and prints reports or transmits the information to another of the business's computers for association with other data.

DETAILED DESCRIPTION OF THE INVENTION

Hardware Configuration of Improved Document Accounting Apparatus

Figure 1:
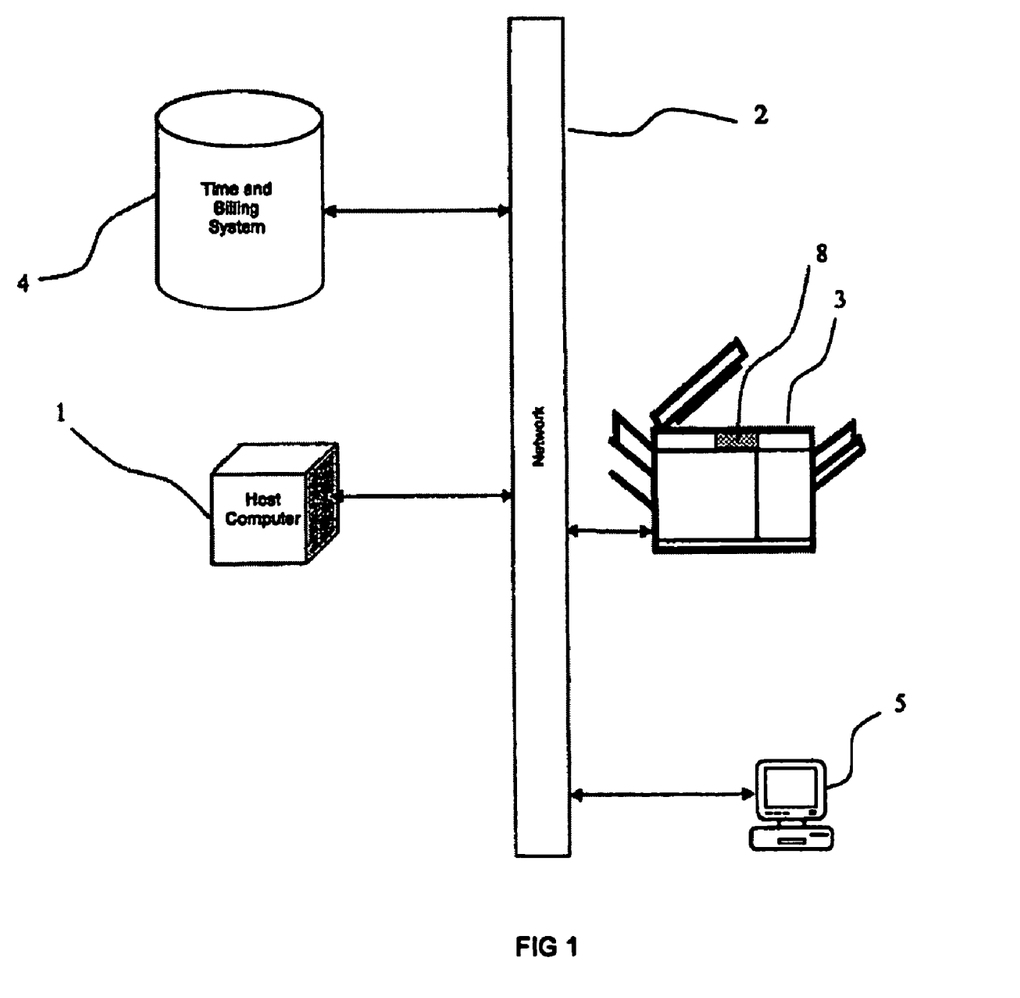
FIG. 1 a schematic view of the present system.
Figure 6:
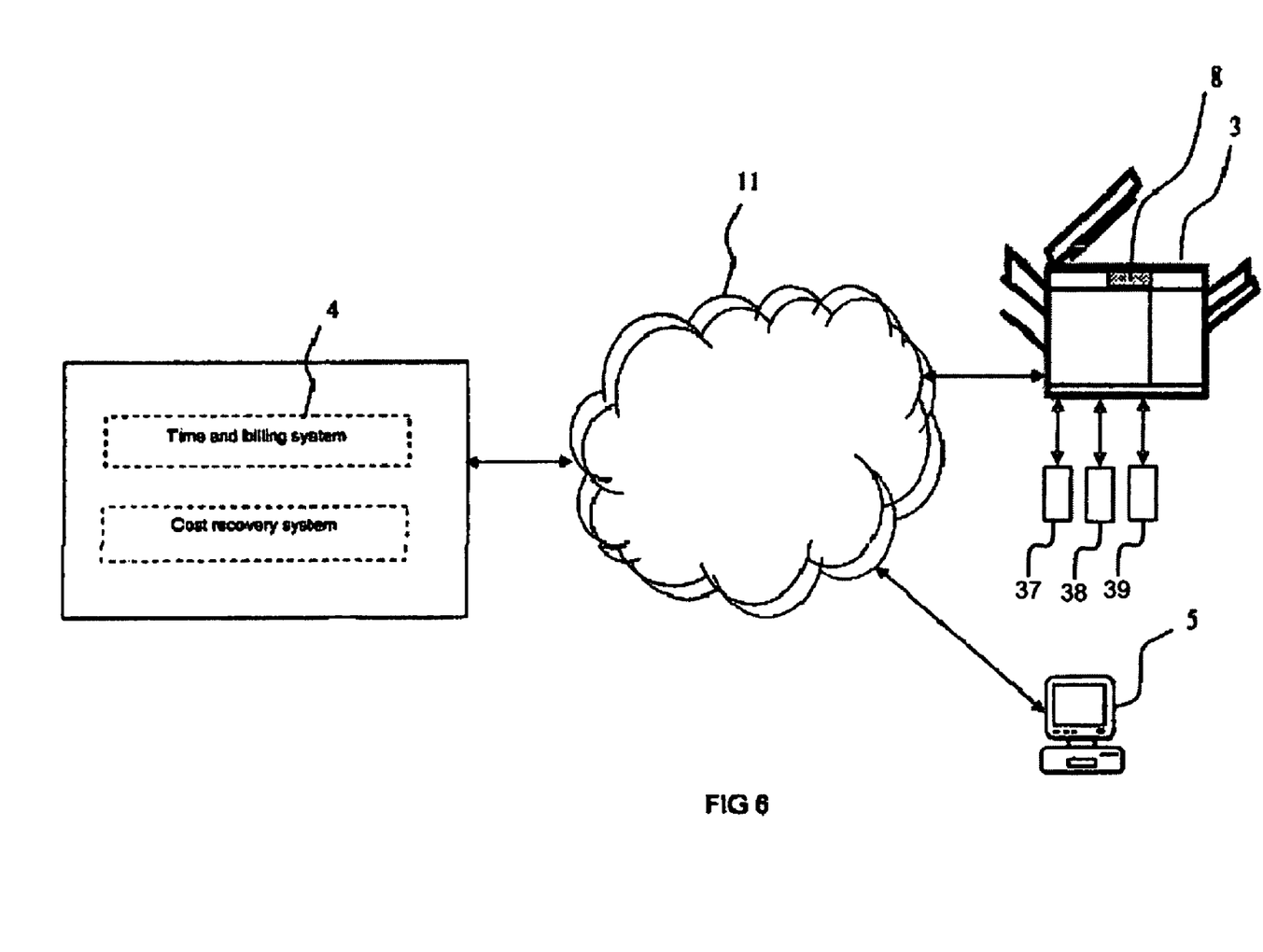
FIG. 6 a schematic view of the present system in which the network transmits information across the internet.
Figure 7:
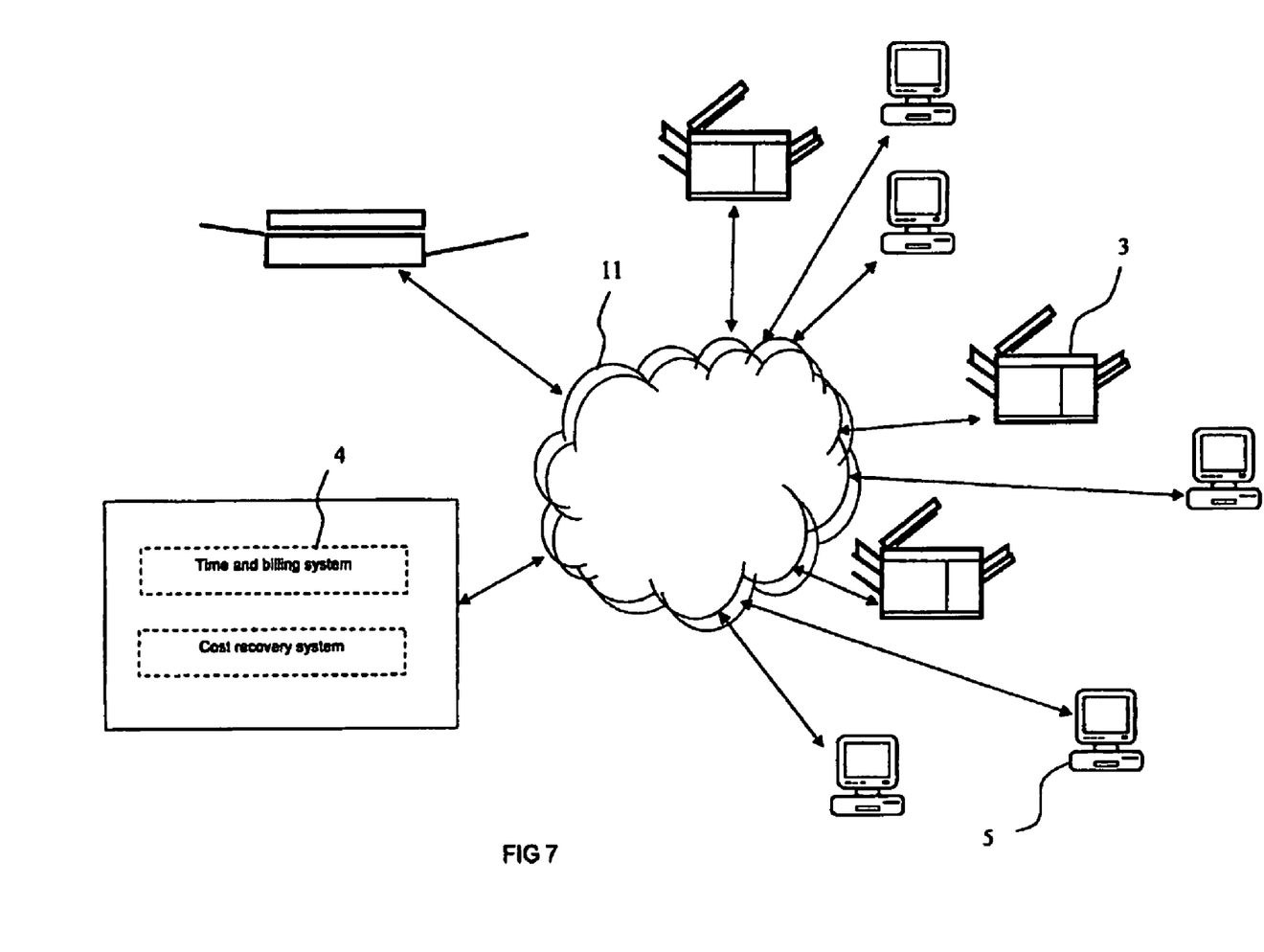
FIG. 7 illustrates the present system with multiple networked MFDs, multiple PC's and other devices, in which the network transmits information across the internet.

FIG. 1 shows the present invention, which utilizes a host computer 1 that is networked 2, by hardwire or wirelessly, with a digital MFD 3 and a time and billing system 4. The host computer 1 is programmed to interface with numerous different brands of time and billing and accounting systems, such as DHDial & Company, ELITE, ESI-Law, FOROB, Juris, L.A.W.S., Legal Master, Omega, PCLaw, Perfect Practice, Prolaw, TABS3, Timeslips, and Visual Practice Management. Data is transmitted to and from the host computer 1 and the time and billing system 4 via the network 2. The host computer 1 is also programmed to interface with numerous different brands of MFDs, such as Canon, HP, Kodak, Konica, Lanier, Minolta, Ricoh, Savin, Toshiba, Xerox. Data is transmitted to and from the host computer 1 and the MFD 3 via the network 2. A number of PC's 5 may also be connected to the network 2 to access the host computer 1 and MFD 3. FIGS. 6 and 7 show the preferred embodiment in which the internet 11 is the communications network.

In prior art the cost recovery server is located behind the client's firewall on its internal network. In this invention, the MFD may be configured behind the client's firewall or, optionally, be configured to communicate securely via SSL or HTTPS to a web server located at a hosted facility remote from the MFD that will allow validation of user and client identifiers as well as collect transactions for reporting and billing purposes. This hosted variation wilt allow for reduced client costs by sharing servers with multiple clients and reducing support and maintenance costs. The time and billing system may be on a difference computer than the preset cost recovery system, or the time and billing and cost recovery system may be on the same computer.

Figure 8:
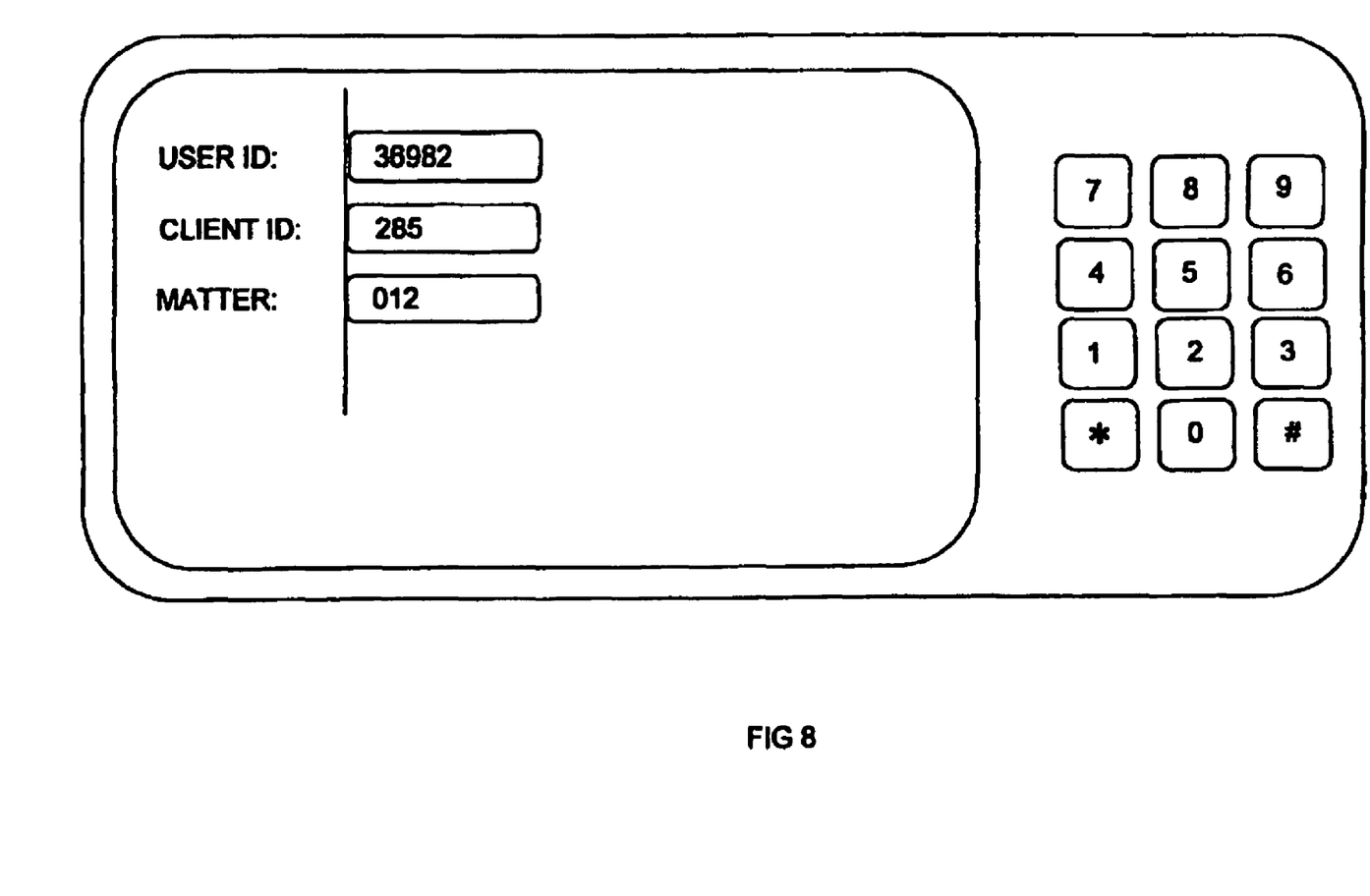
FIG. 8 illustrates a screen display with a numeric keypad.

The MFD 3 is programmed to cooperate directly with the host computer 1. A digital MFD has a touch screen 8 (or keypad with LCD screen) that the user manipulates to enter data and otherwise indicate to the MFD what task is to be done. Preferably the touch screen can be configured to show a keypad, as illustrated in FIG. 8. While an alphanumeric keyboard, such as the American standard QWERTY keyboard may be employed, the preferred embodiment enables all identifiers to be entered with a number-only keypad. This touch screen has a graphical user interface (GUI) and application program interface (API) which is modified to accept data from the user that is then conveyed to the host computer 1 by the MFD 3. The API is modified to include software for an expense recovery module that utilizes the GUI to display fields to accept additional user input. In the preferred embodiment, this modified interface accepts user identifiers and client identifiers and transmits them to the host computer 1. The API may be further modified to accept additional parameters such as job number, price per copy, or others. Because the host computer 1 is connected to the MFD 3, a separate function control module is not needed at each MFD.

Generally the host computer is a web server, referred to in Applicant's co-pending applications as an expense recovery server. While the application program interface can be programmed in any number of ways in any programming language, in the preferred embodiment the application program interface will be web-enabled, using http and TCP/IP protocols, and XML, Java, C++ or other programming languages, as is known in the art. The preferred embodiment will perform the following functions:

Initiate communication between the MFD and a host computer;

Provide a setup field to identify the host computer TCP/IP address;

Prompt for billing fields when a MFD button is activated. If a network connection time-out occurs, the billing numbers entered may be validated against a locally stored table on the MFD. If the MFD user walks away, the system will save the values after a given time-out period, clear the values, and return to the ready state;

Provide XML- or configuration file-defined screens that contain many input fields and action buttons;

Receive text entry via an input means on the MFD, such as the keypad or touch screen. Each input field may receive alphanumeric characters. The input fields may be text entry or dropdown box, but identifiers are preferably numeric and entered on a numeric keypad that is integral with the MFD;

Pass screen content to the host computer when an action button is activated; or upon network outage transactions may be stored locally until such time that network connectivity is restored;

Accept a 'success flag' from the host computer and display the standard copy screen;

After a transaction, submit a transaction record to the host computer. The transaction record includes: MFD identifier, date/time stamp, copy count (or initial meter count and final meter count), transaction termination status. Additional functions may be added, such as recording the MFD operator's ("user's") identifier.

The preferred embodiment further includes the following functions:

After the user enters a valid user identifier or client identifier at the MFD panel, the name of the user or client being billed will be displayed on the MFD screen so the user can verify the correct user and client being charged;

Minimize the number of keystrokes needed by initiating data entry by simply typing an identifier and eliminate menu selections by entering data separated by a separator on the numeric keypad, such as the "*" or "#" signs;

Enable the user to separate the client number from the client's matter number;

Enable the user to search by name for a client to bill;

Enable the user to recall the most recent client numbers used;

Auto-tab from one field to the next by automatically moving to the next field upon reaching a predetermined number of characters entered;

Auto-fill each field by logically recalling and repeating the characters that most closely match the characters already entered;

Allowing users to set-up pre-set speed dial buttons for single billing code entry;

Allowing users to instruct the MFD to email a copied document to an email address, typically the user's;

Allowing data entry without keystroke, by employing a proximity card reader, a swipe card reader, or biometric login such as retinal or fingerprint access;

Pass information to a digital device such as a digital scanner or personal data assistant like a Blackberry®;

Sensing and notifying an administrator when the MFD is not working properly

Identifying more precisely the type of transaction that is taking place, for example copying, scanning, or faxing from a given device;

Tracking and transmitting more detailed transaction data about consumables such as staples, oversize paper, color paper, color printing, amount of color printing, utilization of consumables such as toner, etc.

Figure 2:
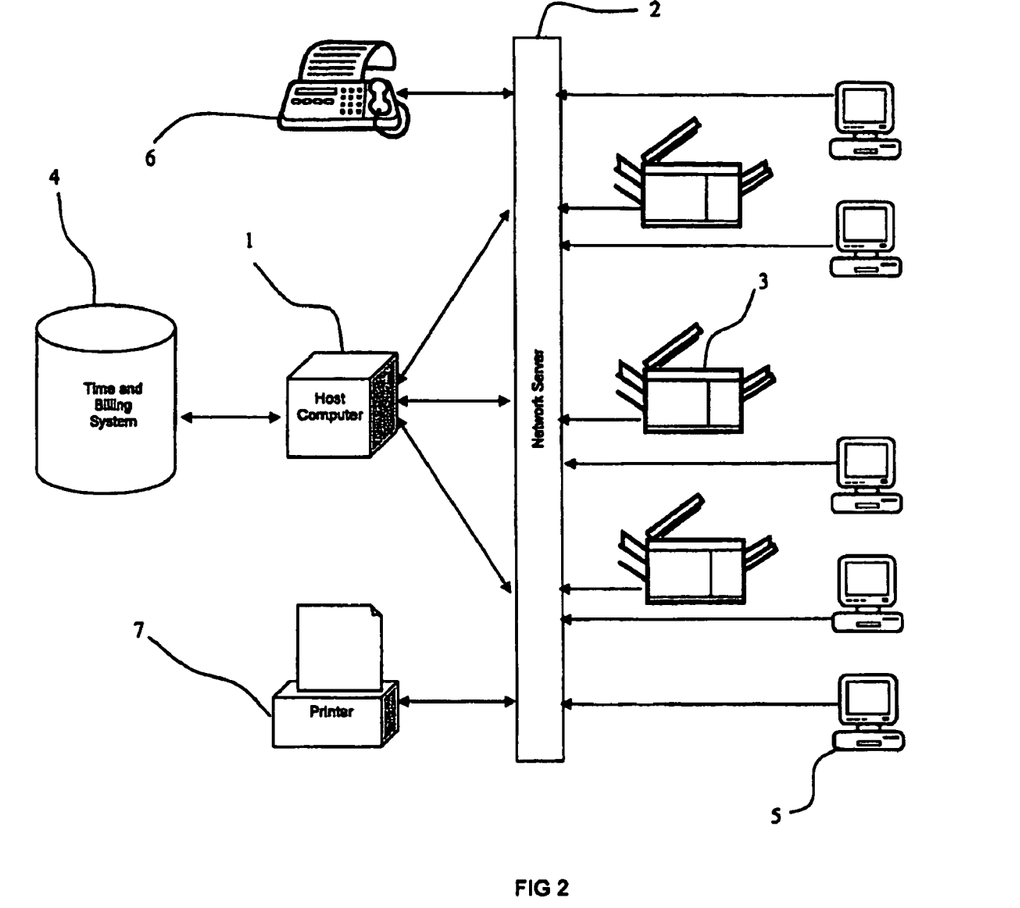
FIG. 2 illustrates the present system with multiple networked MFDs, multiple PC's and other devices.

The host computer is preferably a web server. FIG. 2 illustrates an host computer networked to multiple MFDs 3 and multiple PC's 5. The effect is that for a medium size law firm having 100 MFDs, only one host computer 1 is necessary for copy control management of the entire firm, greatly reducing the cost compared to over 100 copy control modules in addition to a cost recovery server, and intensive service technician time. The network connections are typically 100 base T cable, or the equivalent.

The preferred embodiment has a number of features to facilitate fast and correct data entry. It is very common for a large firm to have many thousands of client charge numbers sequentially numbered so while a number could valid, it could have been mistyped by one digit. After the user enters valid user identifier or client identifier at the MFD panel, the host computer or MFD will return the name of the user or client being billed on the MFD screen so the user can verify the charge number is correct. The name return display will ensure the correct client is being billed.

To further improve the speed and accuracy of data entry by minimizing the number of keystrokes involved, the user does not have to first touch the screen to activate the field. Instead, the process is streamlined by allowing the user to initiate login by first typing an identifier into the MFD's numeric keypad. That is, the user does not have to touch a key to indicate to the MFD that the user wants to begin data entry. To eliminate additional keystrokes for next field selection, field entries may be separated by a separator on the numeric keypad, such as the * (known as the star or asterisk) or the # (pound) SEPARATOR key which is interpreted as next field or enter. Allowing all entry via the MFD's built-in keypad allows for quick, streamlined entry and less user confusion. For example, the user would follow the following steps to enter the user identifier and client identifiers:

User enters numeric user identifier and presses # key

User enters numeric client identifier and presses # key

Other fields entered as needed

The MFD's clear button is used to backspace in case of error

It is common for businesses such as law firms or accounting firms to have a client identifier with a referenced sub list that is keyed to the this client number. This sublist is sometimes referred to as a matter list. Due to field limitations, previous expense recovery systems utilized a single field in which both client number and matter number were entered and separated by a separator. This invention expands the field set so that these entries can be entered and validated (confirmed) in two separate fields. The client identifier is thus broken into two fields, a client identification to identify the client and a matter identification to identify the matter in the sublist. The user is able to see the details of each field and upon entry error quickly determine if either field (the client or matter) was incorrect and make appropriate corrections.

The present invention includes a search button on the MFD screen which will allow the end user to easily search by name for a client to bill. This invention also includes a button on the MFD screen which, when activated, will recall the several most recent client numbers used. After entering a valid user identifier, a button selection will recall from a server store the most recent client identifiers used. Upon reaching a predetermined number of digits the system automatically moves to the next field thus reducing one step of pressing an enter or next field key. The system also employs auto-fill, as is known in the art of word-processing. As the user begins to type an identifier, the system automatically finds the closest match from entries previously made or stored in the system. Finally, the present invention employs a speed dial system, as known in the art of cellular phones, in which the user has pre-set combinations of identifiers that are entered with the touch of a single button or a code of one or two digits.

The present invention also enables the user to instruct the MFD to email a copied document to an email address. Typically the email address has been previously associated with the user's identifier and is stored on the host computer or the MFD, but the user may also send a copied document to a third party.

This invention minimizes keystrokes by allowing certain data identifiers to be entered with indirect methods by employing a proximity card reader, a swipe card reader, or biometric login such as retinal or fingerprint access. These devices are known in the art and are available commercially. The card readers or biometric devices may be plugged into the MFD via known means of connectivity, such as a serial or USB cable, compact flash, SD card, memory stick, or even encrypted wireless connections. When a user reaches proximity or swipes card his user identifier is automatically entered into the MFD cost recovery system thereby eliminating manual keystroke entry.

Improved Document Accounting Method

In addition to the apparatus described above, the present invention also comprises a process for improved copy management and accountability. FIG. 2 illustrates a process flow of the present invention. To make copies for a client, the expense of which is to be later recouped from the client, a user enters a user identifier and a client identifier into the MFD's touch screen or keypad that has an interface that captures information from the user and transmits it to the host computer before copying starts. The user identifier and a client identifier are validated by the host computer against a current user and client list, which is available from the existing billing system.

Figure 3:
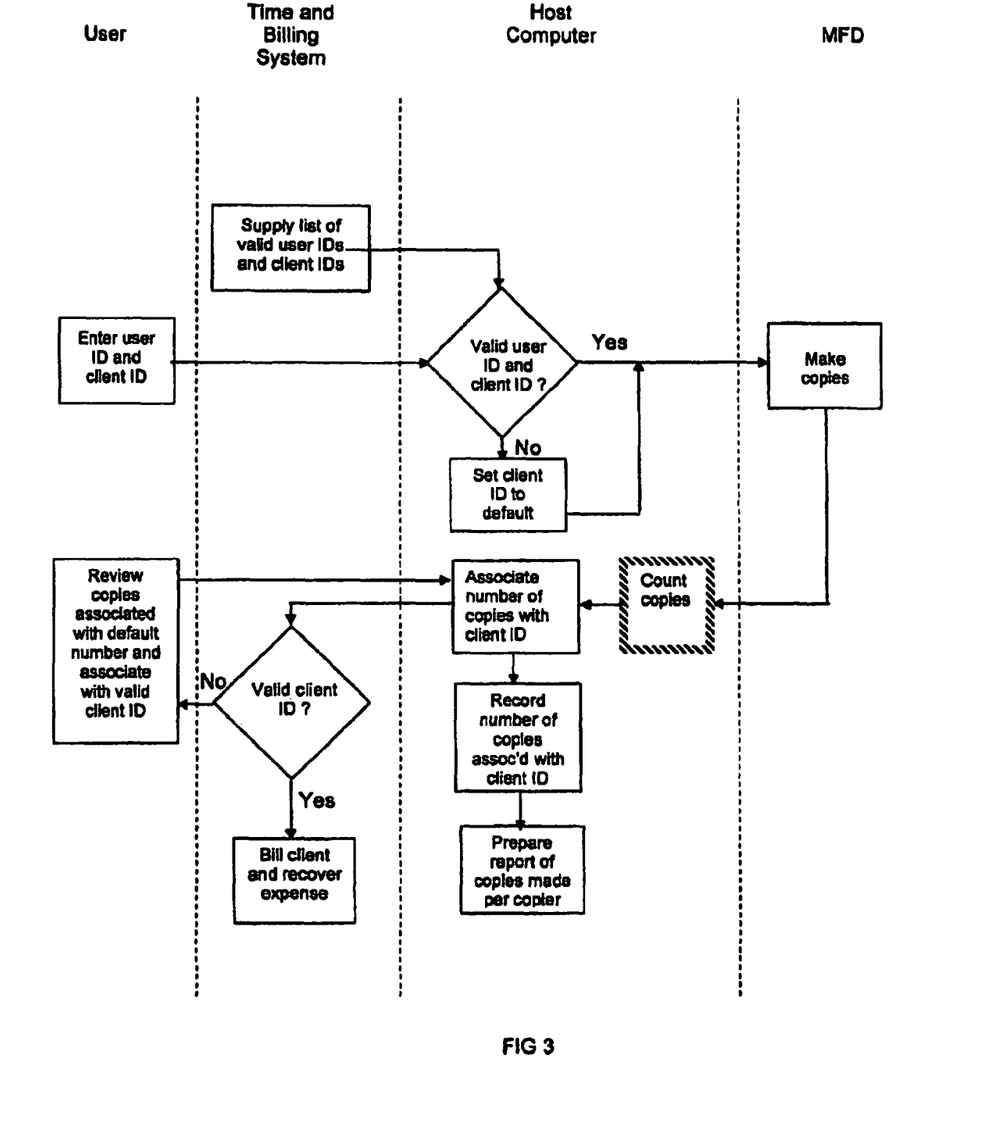
FIG. 3 is a flow chart representing the operation of the present system.
Figure 4:
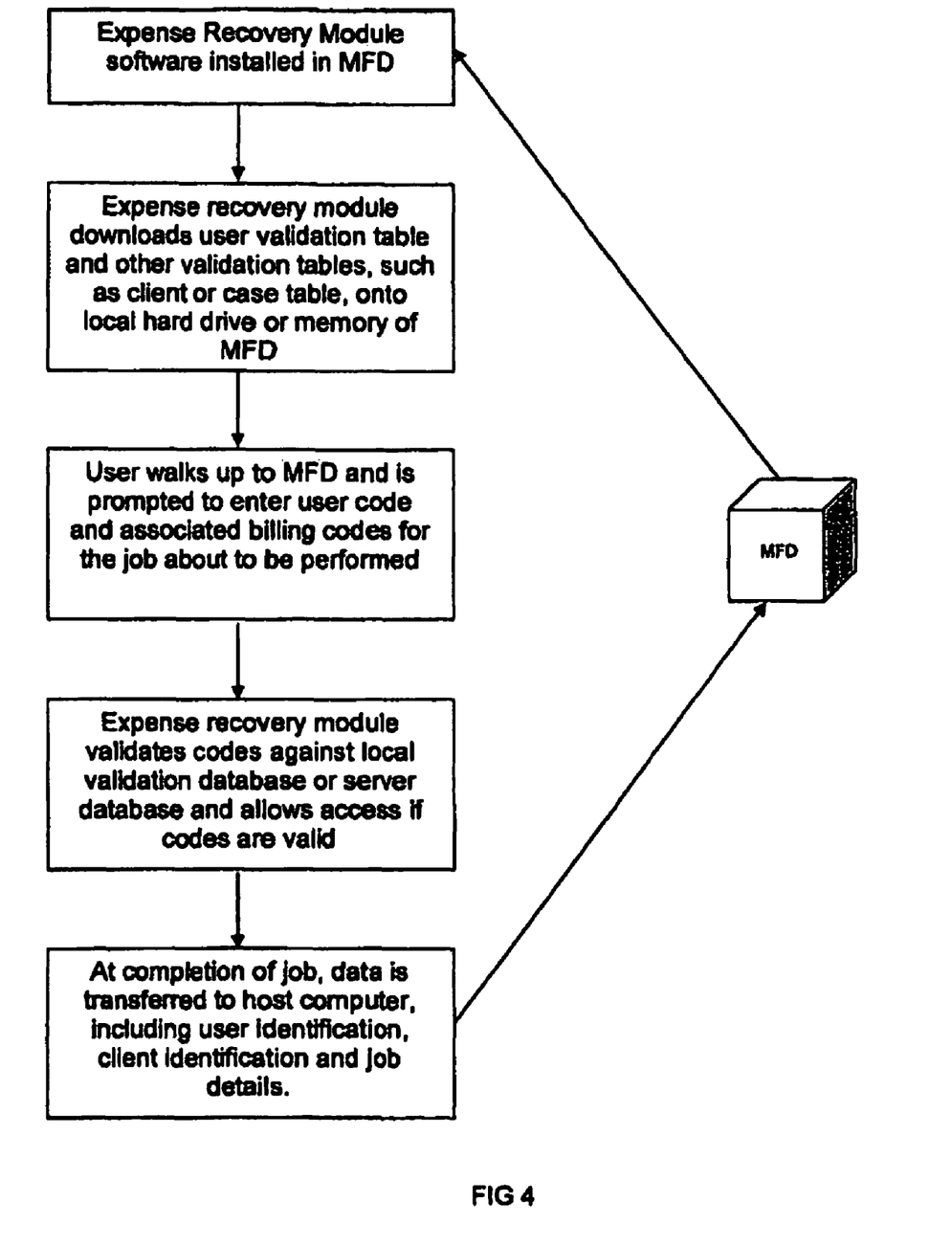
FIG. 4 depicts operational flow from a user perspective.

As depicted in FIG. 3, the current list of valid user identifications and client identifications are retrieved from an identification store in the time and billing system for use by the host computer. It will be appreciated that in a network environment the physical location of the identification store can be in any of several locations, as the identification store can be accessed from anywhere on the network. In some instances it may be beneficial to periodically copy the identification store from the time and billing system to storage in the digital MFD to reduce network traffic and avoid the impact of network outage. An operational flow diagram for this embodiment is shown in FIG. 4.

Upon entry of valid identifiers, the MFD is enabled to complete its task, such as to make copies, fax a document, or scan a document. The MFD is enabled with a function-enable signal, as is known in the art. If no valid client identifier is entered, the system can be set to default to a default identifier and the MFD is enabled; or deny access to MFD until a valid identifier is entered. Copies are made and the host computer obtains the accurate document count directly from the MFD—no independent measurement needs to be made. When the job is complete, a transaction record includes a set of data including MFD serial number, date, time, copy count (or meter start, meter end) and status. The host computer associates this information with the appropriate client (or default) identifier, and transmits the information to the time and billing system for future billing to the client and cost recovery. The user may periodically receive an accounting of copies that were made to the default identifier for further review.

The host computer may be electrically connected to other computers or peripheral devices which may be monitored for copy count, including a fax machine 6 or a printer 7. FIG. 2 illustrates the present system connected to a fax, a printer, and a digital MFD. Further, the host computer may be connected to the Internet and employ a web browser so that it can be monitored at the server, within the firm, or remotely through the Internet or virtual private networks (VPN) using a PC. Reports and data can be exported in numerous formats. Access to the host computer is password protected, and may have several other levels of security for different users.

The present system also adds a number of features for smart administration of the MFD. For example, the MFD periodically sends a status identifier to the embedded software which compares the status identifier to a known set of identifiers. If the status is out-of-normal, the host computer notifies an administrator that the MFD is not working properly. The notification is preferably sent by email, but other notice forms are contemplated such as fax or an instant message.

Older methods of cost recovery through external terminals could not detect transaction types other than copies. This system can track and uniquely identify the type of transaction undertaken, such as copy/scan/fax from the same multifunction device. These transaction types may be included in the transaction data. Similarly, the MFD can track and uniquely identify details such as the staple count, whether oversize paper was used, whether color paper was used, whether color printing was used and, if so, the amount of color per copy (e.g., full color vs. spot color), and utilization of other consumables such as toner. Typically the counts are gathered directly from the MFD's management information base, referred to in the art as MIB. Alternatively, each count can be made by calculating meter start and meter end. Because each consumable has a different cost, cost accounting on this more detailed level allows for more accurate cost recovery.

Improved Workflow System

Figure 5:
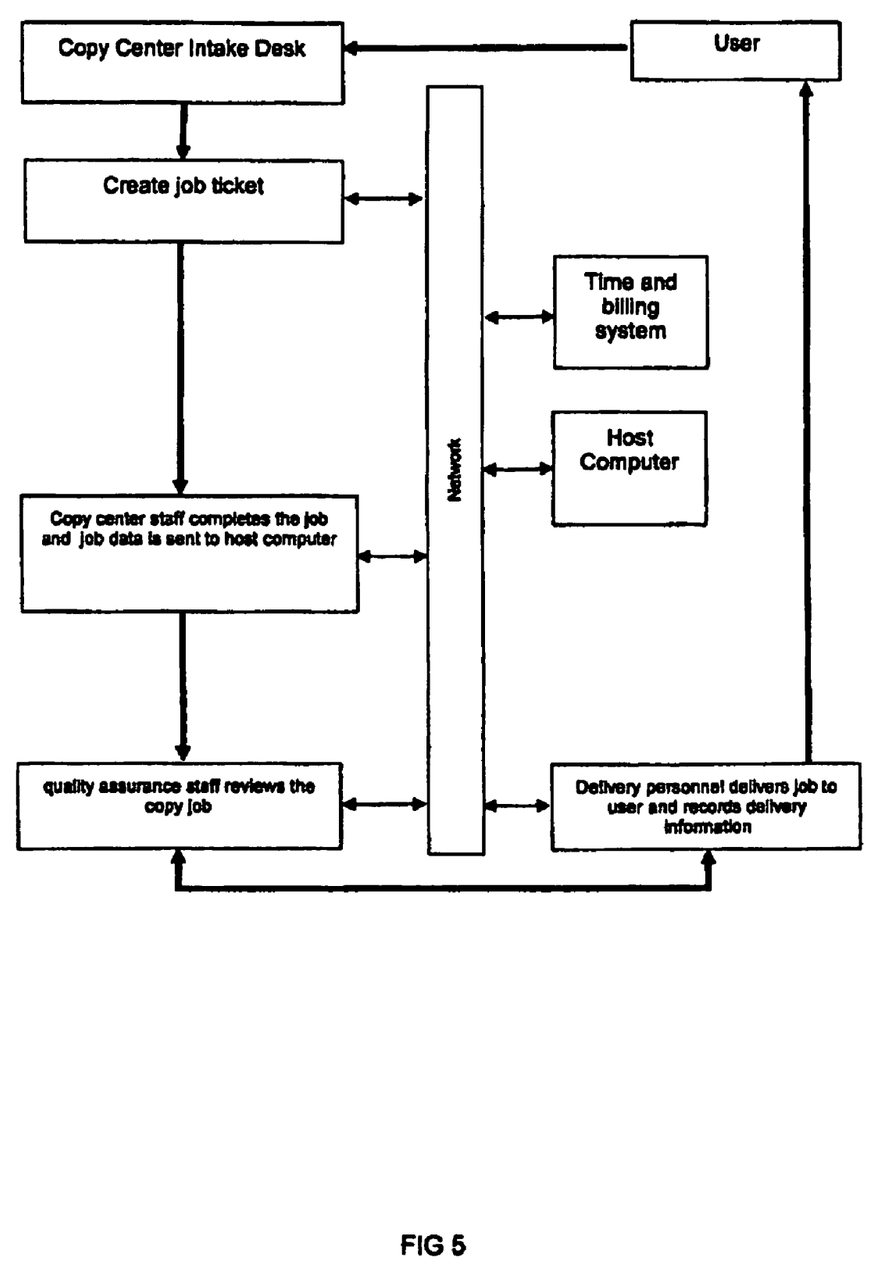
FIG. 5 is an overview of workflow through a copy center with the present system.

The present invention also comprises a process for improved production workflow tracking, or job tracking. FIG. 5 shows an overview of the workflow using the present system. The job request arrives in copy center from a user, either electronically, by hand-delivery, messenger or telephone. The copy center intake desk enters the job into the electronic queue, which is communication with the host computer. The job is assigned a job number, either manually or automatically by the system, and an electronic job ticket is filled out. Data on the job ticket may include requester, client matter, date and time in, date and time due, and a description of job details. The user identifier and a client identifier are validated by the host computer against a current user and client list, which is available from the existing billing system. The job is completed by the copy center staff, including copying, quality assurance, and delivery. Quality assurance staff may enter job data, as well. For example, if a job has to be redone, the renegotiated due date and time can be entered. Or, the replacement copies can be subtracted from the total job count; with proper tracking, the client will not be charged for poor quality copies. The delivery staff can also enter data into the host computer, such as the time delivered. When the copy job is complete, transaction record information can be used to identify each copy, print, scan or fax job, as well as the turnaround time for each job, and the person handling the job. The host computer can produce reports using this data, or transmit the data to a business's central computer using existing network connections for associating the job data with internal company data. The combination of client-Level cost recovery with job-level production tracking improves internal production workflow, thereby reducing time and cost.

The present invention also provides for integrating other digital devices with the expense recovery system. These digital devices include digital document devices such as scanners or printers, and digital personal communication devices such as the Treo® or Blackberry®. These digital devices often require similar login and billing code information as cost recovery systems. In prior art a user was required to Login in and enter billing codes twice, once in the cost recovery system and again in the digital device, for example a document scanning system. This invention allows for an API to pass user and client identifiers automatically to the scanning system by using the cost recovery server as a central server. Thus, this invention transmits transaction data to one or more other digital devices that are stand-alone or, in the case of prior art equipment, that are incorporated in the MFD.

In some prior art MFDs, a single MFD has segmented copy, fax, and scan environments within the same machine which do not automatically pass certain information from one segment to the other. This results in a user having to enter the user and client identifiers each time the user wants to cause a certain function to happen, even if the same user desires such functions sequentially. For example, a user may have to enter his user identifier and client identifier to first make a copy of a document and then re-enter his user identifier and client identifier to make a scan of the document that was just copied. This invention allows single entry of identifying data. The invention stores the unique serial number of the MFD in use and transmits it and the user's identifier to each segment of the MFD, such that the user can request multiple functions without having to re-enter identifiers. For example, a user can enter his user identifier and client identifier only once to make a copy, followed by a scan, followed by a fax. Thus, this invention transmits transaction data to one or more other digital devices that are incorporated in the MFD.

Pricing of System

Conventionally, a firm will pay a fee to purchase or lease each copy control module, plus a monthly fee to have the service technician visit each MFD, as well as a fee for the number of copies made. The present system has the advantage of being able to remotely determine the number of copies made and which MFDs are in need of preventive maintenance. Further, the cost of the host computer and installation is much lower than the cost of numerous copy control modules.

Reports

The reports to the user can be printed, faxed, or emailed using the host computer's web access. The resulting bill sent to the client can be formatted in any number of ways, including sorting and filtering by client number, matter number, responsible attorney, date, cost, description code, user identifier, location, city, state, MFD type, MFD trend usage, volume statistics, MFD uptime, MFD preventative maintenance history, employee time spend on the job, etc. Finally, because the system interfaces with the time and billing system, each client can easily be charged a different cost for its copies.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

What is claimed:

1. A cost recovery system, comprising:
   a multi-function device including an internal meter;
   a host computer connected to the multi-function device;
   wherein the multi-function device is configured to scan a paper document and create an electronic file;
   wherein the multi-function device is configured to print a paper document from an electronic file;
   wherein the multi-function device is configured to track transaction information using the internal meter;
   wherein the multi-function device is configured the multi-function device to communicate a transaction record including information concerning the transaction directly to the host computer; and
   wherein the multi-function device is configured to provide a user identifier and a client identifier to the host computer for validation;
   wherein the multi-function device is configured to photocopy paper documents by scanning the document to create an electronic file and then printing a paper document from the electronic file.

2. A cost recovery system, comprising:
   a multi-function device including an internal meter;
   a host computer connected to the multi-function device;
   wherein the multi-function device is configured to scan a paper document and create an electronic file;
   wherein the multi-function device is configured to print a paper document from an electronic file;
   wherein the multi-function device is configured to track transaction information using the internal meter;
   wherein the multi-function device is configured the multi-function device to communicate a transaction record including information concerning the transaction directly to the host computer; and wherein the multi-function device is configured to provide a user identifier and a client identifier to the host computer for validation;

wherein the multi-function device is also configured to electronically transmit electronic files created by the multi-function device via electronic mail.

3. A cost recovery system, comprising:

a multi-function device including an internal meter;

a host computer connected to the multi-function device;

wherein the multi-function device is configured to scan a paper document and create an electronic file;

wherein the multi-function device is configured to print a paper document from an electronic file;

wherein the multi-function device is configured to track transaction information using the internal meter;

wherein the multi-function device is configured the multi-function device to communicate a transaction record including information concerning the transaction directly to the host computer; and wherein the multi-function device is configured to provide a user identifier and a client identifier to the host computer for validation;

wherein the multi-function device is also configured to electronically transmit electronic files created by the multi-function device via facsimile.

4. A cost recovery system, comprising:

a multi-function device including an internal meter;

a host computer connected to the multi-function device;

wherein the multi-function device is configured to scan a paper document and create an electronic file;

wherein the multi-function device is configured to print a paper document from an electronic file;

wherein the multi-function device is configured to track transaction information using the internal meter;

wherein the multi-function device is configured the multi-function device to communicate a transaction record including information concerning the transaction directly to the host computer;

wherein the multi-function device is configured to provide a user identifier and a client identifier to the host computer for validation;

wherein the multi-function device and the host computer are connected via a network; and further comprising a billing system connected to the network.

5. The cost recovery system of claim 4, wherein the host computer is configured to validate a user identifier and a client identifier against a current user list and a current client list provided by the billing system.

6. The cost recovery system of claim 5, wherein:

the host computer is configured to transmit transaction information from the transaction record and the user identifier and the client identifier to the billing system;

the host computer is configured to provide the user identifier and the client identifier to the billing system; and the billing system is configured to validate user and client identifiers provided by the host computer.

7. A cost recovery system, comprising:

a multi-function device including an internal meter;

a host computer connected to the multi-function device;

wherein the multi-function device is configured to scan a paper document and create an electronic file;

wherein the multi-function device is configured to print a paper document from an electronic file;

wherein the multi-function device is configured to track transaction information using the internal meter;

wherein the multi-function device is configured the multi-function device to communicate a transaction record including information concerning the transaction directly to the host computer; and wherein the multi-function device is configured to provide a user identifier and a client identifier to the host computer for validation;

wherein:

the transaction record includes an identifier associated with the multi-function device, a count, and a transaction termination status; and the transaction record includes information identifying the type of transaction that is taking place.

8. The cost recovery system of claim 7, wherein the count is expressed as an initial meter count and a final meter count.

9. The cost recovery system of claim 7, wherein:

the multi-function device includes a management information base; and the multi-function device is configured to generate the count from information contained in the management information base.

* * * * *